United States Patent
Knowles et al.

[15] 3,660,183

[45] May 2, 1972

[54] STABLE SUSPENSIONS

[72] Inventors: Edwin C. Knowles, Poughkeepsie; Frederic C. McCoy, Beacon; Norman R. Odell, Wappingers Falls, all of N.Y.

[73] Assignee: Texaco Inc., New York, N.Y.

[22] Filed: Dec. 27, 1961

[21] Appl. No.: 162,549

Related U.S. Application Data

[63] Continuation-in-part of Ser. No. 39,426, June 29, 1960.

[52] U.S. Cl..................................149/21, 149/18, 149/22, 149/87, 149/109
[51] Int. Cl. .........................................................C06d 5/10
[58] Field of Search......................149/21, 22, 87, 17, 18, 19; 252/317; 167/16, 42; 424/141; 44/7

[56] References Cited

UNITED STATES PATENTS

| | | | |
|---|---|---|---|
| 3,023,094 | 2/1962 | Morton et al. | 149/18 |
| 2,927,849 | 3/1960 | Greblick et al. | 149/22 X |
| 2,885,366 | 5/1959 | Iler | 252/317 X |
| 3,031,417 | 4/1962 | Bruce | 252/317 X |

*Primary Examiner*—Benjamin R. Padgett
*Attorney*—W. P. Epperson

[57] ABSTRACT

Stable suspensions useful as high energy propellant and agricultural compositions comprising a finely-divided vehicle-insoluble organic or inorganic powder, 0.2 to 3.0 percent vehicle-insoluble microfibers and a liquid vehicle which is either a liquid hydrocarbon or a hydrocarbon soluble polar hydrocarbon derivative such as an amine, amide, ketone, alcohol, etc. The microfibers are either inorganic microfibers having an average particle between 0.01 and 2.0 microns or organic microfibers having an average fiber diameter between 1 and 20 microns. A typical stable suspension comprises 68.72 percent aluminum powder, 1.43 percent diethyl stearyl amide, 0.75 percent glass microfibers having an average fiber diameter of 0.05 to 0.2 microns and 29.1 percent kerosene. This stable suspension useful as a propellant was prepared by blending glass microfibers into the kerosene fraction to form a soft gel and separately blending the aluminum powder with distearyl amide; the aluminum-amide mixture is then slowly added to the glass fiber-kerosene gel until a buttery suspension is formed.

16 Claims, No Drawings

STABLE SUSPENSIONS

This application is a continuation-in-part of Ser. No. 39,426, filed June 29, 1960.

This invention relates to stable suspensions containing finely divided powdered material in a liquid vehicle which is a hydrocarbon or a hydrocarbon substituted polar compound. This invention also relates to a process for suspending finely divided hydrocarbon-insoluble organic and inorganic compounds in the form of a stable suspension.

The stable suspensions of this invention comprise a finely divided organic or inorganic powder which is insoluble in the liquid vehicle, 0.2 to 3.0 weight percent of vehicle-insoluble microdimensional fibers and a liquid vehicle which is either a liquid hydrocarbon or a hydrocarbon-soluble polar hydrocarbon derivative containing an amino, hydroxyl, carbonyl, amide, imide, carboxylic or ester radical.

The stable suspensions of this invention are useful in many diverse fields. This invention provides means for preparing stable suspensions comprising 50 to 90 weight percent high energy powder such as aluminum, boron and boron carbide in an essentially hydrocarbon liquid vehicle. Suspensions containing such concentrations of high energy powders have heats of combustion of the order of 2,000,000 Btu's per cubic foot and represent a significant advance in the field of high energy propellants of the suspension type. Prior to this invention it has not been possible to suspend more than about 30 weight percent of such materials in the form of a stable suspension in a liquid vehicle.

The stable suspensions employing microdimensional fibers as a suspending matrix also find wide application in the formulation of agricultural compositions. Hydrocarbon-insoluble materials which possess fungicidal, insecticidal and pesticidal activity such as copper oxide, copper sulfate and manganese ethylene bis(dithiocarbamate) are stably suspended in a hydrocarbon vehicle in the form of a finely divided powder using microdimensional fibers as a suspending matrix. Suspensions containing as high as 20–50 percent active component can be shipped in the form of stable concentrates and diluted with additional vehicle prior to agricultural applications.

Stable matrix suspensions of this invention are also useful in oil base drilling fluids. The suspending power of microdimensional fibers can be used to formulate oil-base drilling fluids containing stably suspended therein oil-insoluble drilling mud components such as barytes, iron oxide and calcium sulfate.

Microfibers have also proven useful in improving paint formulations. The incorporation of the prescribed concentrations, namely, 0.2 to 3.0 weight percent, of microfibers has greatly enhanced the stability of oil-base paints. The microfibers act as a suspending matrix for the large concentration of solid pigments present in the paint and result in smoother, more stable oil-base paints. The incorporation of microfibers in paints eliminates to a great extent the troublesome stirring and mixing operations normally required with such products after extended storage. microfiber-thickened oil-base paints are comparable to polyacrylate emulsion paints in "no-drip" properties and are especially useful in fire retardant formulations.

The process of this invention for preparing stable suspensions of hydrocarbon-insoluble finely divided powders comprises thickening the liquid vehicle with hydrocarbon-insoluble microdimensional fibers and subsequently adding thereto with mixing the hydrocarbon-insoluble material in finely divided powder form. The liquid vehicle is a liquid hydrocarbon fraction or a hydrocarbon-substituted polar derivative containing one or more amino, hydroxyl, carbonyl, amide, imide, carboxyl and ester radicals. When the insoluble powder concentration is above about 25 weight percent of the suspension and the vehicle is a liquid hydrocarbon fraction, the vehicle advantageously contains at least 0.2 weight percent of a texture-improving agent which is a hydrocarbon-soluble polar hydrocarbon derivative of the foregoing type having a hydrocarbon chain length of at least 12 carbon atoms. The microdimensional fibers employed to thicken the liquid vehicle are added in a concentration such that they constitute 0.2 to 3.0 weight percent of the total suspension.

The key material in the formation of stable suspensions is the microdimensional fibers. These fibers, which may be of the organic or inorganic type as long as they are essentially hydrocarbon-insoluble, provide the necessary matrix for retaining the insoluble powdered material in stable suspensions which are of a soft, easily worked consistency and which can be diluted with additional liquid vehicle while still retaining the powdered material in stable suspension.

The microdimensional fibers employed as suspending matrices are insoluble and non-reactive with the liquid vehicle, that is, with both hydrocarbons and with hydrocarbon-soluble polar derivatives containing amino, hydroxyl, carbonyl, amide, imide, carboxylic or ester radicals. Effective inorganic fibers are asbestos fibers, graphite fibers, glass fibers of various types and quartz fibers. Chrysotile fibers are a particularly preferred type of asbestos fibers while soda-lime glass fibers, quartz microfibers, boro-silicate (pyrex) fibers and lead glass microfibers are examples of effective glass microfibers. Organic microfibers effective in forming the stable suspensions of this invention are cellulose fibers and fibers of a large number of cellulose derivatives such as nitrocellulose fibers, acetylated cellulose fibers, carboxylated cellulose fibers, aminoethyl cellulose fibers, cellulose phosphate fibers and carboxymethyl cellulose fibers. Other effective organic microfibers are perfluoroethylene (Teflon) fibers, fibers of polyhalogenated olefin polymers, polypropylene fibers, polyvinyl alcohol fibers and polyvinyl acetal fibers. Glass, cellulose and asbestos fibers have proven particularly effective in forming the stable suspensions of this invention.

The average fiber diameter of the microfibers is an important factor in preparing the stable suspensions of this invention. There is a substantial difference between the organic and inorganic microfibers with regard to the average fiber diameter required for the preparation of stable suspensions. This difference is due at least in part to the different densities and structural configurations of inorganic and organic microfibers.

When employing inorganic microfibers it is necessary to employ microfibers having an average fiber diameter between 0.01 and 2.0 microns and preferably between 0.01 and 0.5 micron in order to form stable suspensions. When the inorganic microfiber diameter is above 2.0 microns, the fibers do not provide an adequate matrix for the suspension and maintenance of the insoluble powdered material in the form of a stable suspension.

In contrast, organic microfibers having fiber diameters as large as 20 microns can be used in preparing stable suspensions although preferably the suspensions are prepared with organic microfibers having an average fiber diameter between about 1 and 12 microns. The upper fiber diameter limit of 20 microns for organic microfibers is critical for the formation of stable suspensions in the same manner as is the upper fiber diameter limit of 2 microns for inorganic microfibers. Stable suspensions are not formed with inorganic microfibers having an average fiber diameter above 2.0 microns or with organic microfibers having a fiber diameter above 20 microns.

The concentration of the microfibers is between 0.2 and 3 and usually between 0.4 and 2.5 weight percent of the total suspension. To a large extent, the concentration of fibers is proportional to the amount of insoluble material suspended in the vehicle. With gel propellants in which the concentration of high energy powdered material is between 50 and 90 percent of the total vehicle, the microfiber concentration usually falls between about 1 and 3 weight percent. On the other hand, in agricultural compositions, particularly after dilution, where the active ingredient concentration is between about 2 and 8 weight percent, the microfiber concentration is in the lower portion of the prescribed range, namely, 0.2 and 1.0 weight percent.

The most widely used vehicle is a liquid hydrocarbon fraction boiling above about 150° F. The hydrocarbon fraction usually has a boiling point range falling between 350° and 800° F. Kerosene, gas oil and lubricating oil fractions are used in the preparation of the suspensions of this invention.

In suspensions designed for agricultural use, it is customary to use a hydrocarbon vehicle having a boiling point range between about 400° and 750° F. since retention of the vehicle on the plants is desired to take advantage of the effectiveness of hydrocarbon fractions in preventing the spread of various fungus diseases such as the Sigatoka which afflicts bananas. In agricultural compositions it is desirable for the base hydrocarbon vehicle to have a low aromatic content which is normally less than about 15 percent and preferably less than 10 percent. Liquid hydrocarbon vehicles used in the formulation of agricultural suspensions comprise mainly a mixture of aliphatic and cycloaliphatic hydrocarbons having a boiling range as indicated above and having an unsulfonatable residue above 85 percent and preferably above 90 percent.

Hydrocarbon vehicles, particularly useful in the formulation of gel propellants, comprise kerosene and gas oil fractions and jet fuels such as JP–1, JP–2, JP–3, JP–4 and RP–1. Particularly useful are hydrocarbon fractions comprising predominantly paraffinic straight chain hydrocarbons which have been separated from the hydrocarbon mixtures such as kerosene by procedures such as solvent extraction, urea complexing and treatment with molecular sieves. Predominantly straight chain hydrocarbon fractions of this type have particularly high heats of combustion and are excellent vehicles for suspending large concentrations of high energy powdered material in gel propellants.

The liquid vehicles may also comprise a hydrocarbon-soluble polar hydrocarbon derivative containing one or more amino, hydroxyl, carbonyl, amide, imide, carboxylic or ester radicals. The requirement that the polar hydrocarbon derivatives, which may be substituted in whole or in part for the hydrocarbon fraction, must be hydrocarbon-soluble restricts the number of radicals on the substituted hydrocarbon to a maximum of about 4. The minimum hydrocarbon chain length for polar substituted hydrocarbons is about 12 carbon atoms and usually such compounds contain 16 or more carbon atoms.

Examples of amines that can be substituted in whole or in part for a hydrocarbon fraction are the following: octadecyl amine, tetradecyl, amine, eicosyl amine, a mixture of branched chain tertiary alkyl primary amines in which the alkyl radicals contain 11–14 carbon atoms and a mixture of branched chain tertiary alkyl primary amines in which the aliphatic radicals contain a mixture of 18–22 carbon atoms, a secondary amine such as di-octadecyl amine, a diamine such as N-octadecylethylenediamine and a tertiary amine such as tri-2-ethylhexyl amine.

Examples of esters that may be substituted in whole or in part for a hydrocarbon fraction in the vehicle are exemplified by the following: de-2-ethylhexyl sebacate, di-dodecyl a dipate, dodecyl oleate, myristyl laurate and di-isononyl azelate.

Examples of alcohols that can be substituted in whole or in part for a hydrocarbon fraction in the vehicle are exemplfied by the following: tridecyl alcohol, octadecyl alcohol, oleyl alcohol, eicosyl alcohol and hexadecyl alcohol.

Examples of ketones that can be substituted in whole or in part for the hydrocarbon fraction of the vehicle are exemplified by the following: octyl dodecyl ketone, 2-ethylhexyl lauryl ketone, isononyl tetradecyl ketone, di-octadecyl ketone, di-dodecyl ketone and dilauryl ketone.

Examples of amides and imides that can be substituted in whole or in part for the hydrocarbon fraction in a liquid vehicle are exemplified by the following: stearyl amide, oleyl amide, behenyl amide, myristyl amide, N-methyl stearyl amide, N-isopropyl stearyl amide, N-diethyl stearyl amide, distearyl imide and stearyl acetyl imide.

The addition of a texture-improving agent is recommended in suspensions employing a hydrocarbon vehicle and having an insoluble powder concentration above 25 percent of the total suspension. Polar-substituted hydrocarbons having a minimum of 12 and preferably 16 or more carbon atoms improve the stability and texture of the suspension having a high powder content when employed in a concentration equivalent to 0.2 to 20 weight percent and preferably 1.0 to 10.0 percent of the vehicle. Alcohols, amines, amides, imides, carboxylic acids, esters and ketones all impart texture-improving properties to high powder content suspensions in which the liquid vehicle is a hydrocarbon fraction.

The preferred materials for imparting favorable consistency to suspensions containing high powder concentrations are high molecular weight fatty acid amides and imides such as stearyl amide, eicosyl amide and distearyl amide. Fatty acid amides and imides are superior to the other polar compounds in concentrations of about 1.0 to 10.0 weight percent of the vehicle in improving the consistency and texture of a suspension using a hydrocarbon fraction as the vehicle. Another useful polar material for imparting consistency is a high molecular weight fatty acid, for example, stearic acid or behenic acid.

The concentration of the vehicle in the stable dispersions of this invention varies greatly with its intended use. In its broadest aspects the concentration of the vehicle can be as low as 5 weight percent and as high as about 97 weight percent. In high energy propellants in which it is desirable to pack as much high energy powders as feasible into a stable suspension, the vehicle concentration is usually low, that is, in the range of 10 to 50 weight percent of the total suspension. The vehicle is present in agricultural composition concentrates, the form in which such stable suspensions are normally shipped, in amounts between 30 and 70 weight percent of the total suspension. Such concentrations are usually diluted with 1 to 5 volumes of vehicle prior to application and in such diluted suspensions the vehicle concentration usually forms between 70 and 95 weight percent of the total suspension.

The stable suspensions of this invention are simply prepared by suspending the required concentration of microdimensional fibers in the vehicle by mixing means such as a Waring Blendor to form a soft gel. If necessary, a texture improving material, for example, a high molecular weight polar compound such as a fatty acid amide, is added to the fiber-thickened vehicle and thoroughly mixed therein. The finely divided powder is than slowly added with stirring to the fiber-thickened vehicle until the desired amount of powder is suspended therein. Colloid mills and centrifugal wet mills may be employed for the suspension of the finely divided powder in the fiber-thickened vehicle.

An alternate procedure involves mixing the texture improving agent, namely, the hydrocarbon-soluble polar hydrocarbon derivative, with the finely divided powder and slowly adding the resulting mixture to the fiber-thickened vehicle.

The powders employed for the formulation of the stable suspension of this invention have a maximum particle size of 20 mesh but are usually smaller than 100 mesh. Expressed on a different basis, the powders usually have an average particle size between 0.1 and 840 microns. Powders having a particle size between 200 and 325 mesh have proven particularly useful in the formulation of the stable suspensions of this invention. The powders are preferably of the spherical type rather than of the plate type because the former have better "-packing" properties thus permitting more powder to fit into a given volume of vehicle. Advantageously the powders are not all of uniform size but possess a gradation in particle size below the prescribed maximum; when the powders have a substantial gradation in particle size, the smaller particles occupy the voids between the larger particles with the resulting formation of a denser suspension.

In formulating easily workable, stable propellants, low atomic weight elements and compounds of such elements having high heats of combustion on both a weight and volume basis are employed. Powdered materials meeting these requirements are aluminum, boron, beryllium, carbon, boron carbide, and mixtures thereof. Aluminum, boron, boron carbide and mixtures thereof are the preferred materials for forming propellants from the standpoint of both availability and their heats of combustion. Stable suspensions containing 75 to 90 weight percent powdered aluminum, boron or mixtures thereof are particularly effective propellants.

In addition to the above high energy powders, other hydrocarbon-insoluble metals, metalloids, metal compounds, and metalloid compounds are suspended in a hydrocarbon or substituted hydrocarbon vehicle employing microfibers as a matrix. For example, high concentrations of metal carbide such as silicon carbide and titanium carbide can be suspended in the form of finely-divided powders in microfiber-thickened liquid vehicle. Such suspensions are useful as grinding adjuvants. Finely divided magnesium can be suspended in a fiber-thickened hydrocarbon vehicle and the resulting suspension employed as a flare.

Vehicle-insoluble insecticides, fungicides and pesticides which are suspended in the form of the stable suspension include the following inorganic compounds: copper hydroxide, copper oxide, tribasic copper sulfate, copper arsenite, copper oxychloride sulfate, calcium arsenate, lead arsenate, sodium fluoride, sulfur and mixtures thereof. Organic compounds included within this class are manganese ethylene bis(dithiocarbamate), 1-naphthyl-N-methylcarbamate, 3-[2-(3,5-dimethyl-2-oxycyclohexyl)-2-hydroxyethyl] glutarimide (also known as cycloheximide), N-trichloromethyl mercapto-4-cyclohexene-1,2-dicarboximide, sodium, zinc and iron alkyl dithiocarbamates and tetramethyl thiuram disulfide. Mixtures of the foregoing organic and inorganic compounds may also be used in the formation of the stable suspensions.

The finely divided vehicle-insoluble powder comprises 3 to 90 weight percent of the suspension. The concentration of the powder component of the suspension also depends to a great extent upon the use for which the suspension is formulated. In propellants, the high energy powdered material generally constitutes 50 to 90 weight percent of the total suspension. Similarly, in flares containing suspended magnesium and in grinding adjuvants containing suspended silicon and titanium carbides, the powder component is employed in high concentrations of the order of 40 to 80 percent of the total suspension.

In contrast, suspensions designed for agricultural use contain 3 to 40 percent powder with amounts in the upper portion of this range being used in concentrates and amounts in the lower portion of this range being used in diluted suspensions. In paint formulations the pigment solids are present in conventional amounts in the range of 40 to 65 weight percent of the total composition.

The preparation of the stable suspensions of this invention is illustrated in the following examples.

EXAMPLE 1

Soda-lime micro glass fibers having an average fiber diameter of 0.05 to 0.2 micron were blended into a mixture of branched chain tertiary alkyl primary amines containing 11 to 14 carbon atoms (Primene 81–R) to give a soft gel composition comprising 2.5 weight percent glass fibers and 97.5 weight percent mixed t-alkylamines. Aluminum powder of 325 mesh was then added slowly with stirring to the glass fiber-thickened t-alkylamine. There was formed a suspension of soft buttery consistency comprising 70 weight percent aluminum powder, 29.25 weight percent t-alkylamine and 0.75 weight percent glass fiber. This suspension was characterized by good storage stability as evidenced by lack of noticeable separation of the vehicle on more than one week storage. The suspension had an estimated heat of combustion of 1,900,000 Btu./cu. ft.

EXAMPLE 2

The glass microfibers used in Example 1 were used to thicken the same t-alkylamine to a soft gel. A high molecular weight fatty acid amide, specifically distearyl amide, was mixed into a powder (325 mesh) consisting of 2 parts by weight of aluminum powder and 1 part by weight of amorphous boron. The amide-containing boron-aluminum powder mixture was then slowly mixed into the glass fiber-thickened T-alkylamine. The resulting stable suspension had an estimated heat of combustion of 1,850,000 Btu./cu. ft. and the following composition:

|  | Weight Percent |
|---|---|
| Aluminum | 42.2 |
| Boron | 21.1 |
| Fatty acid amide | 1.3 |
| t-alkylamine | 34.5 |
| Glass microfibers | 0.9 |

EXAMPLE 3

Glass microfibers having an average fiber diameter of 0.05 to 0.2 micron were blended into a kerosene fraction having a boiling point range of 330° to 520° F. to form a soft gel. Distearyl amide was added to aluminum powder and suspended thoroughly therein by stirring. The aluminum powder containing the fatty acid amide was then slowly added to the glass fiber-thickened kerosene with stirring until a soft buttery suspension was formed having the following composition:

|  | Weight Percent |
|---|---|
| Aluminum powder | 68.72 |
| Fatty acid amide | 1.43 |
| Glass microfibers | 0.75 |
| Kerosene | 29.10 |

EXAMPLE 4

A suspension was prepared by the same procedure outlined in Example 3 with the change that dioctyl sebacate was substituted for kerosene. On blending the mixture of aluminum powder and fatty acid amide into the glass fiber-thickened dioctyl sebacate, there was produced a smooth buttery suspension having the following composition:

|  | Weight Percent |
|---|---|
| Aluminum powder | 68.72 |
| Fatty acid amide | 1.43 |
| Glass microfibers | 0.75 |
| Dioctyl sebacate | 29.10 |

EXAMPLE 5

A suspension was prepared by the same procedure outlined in Example 3 with the change that tridecyl alcohol was substituted for kerosene. On blending the fatty acid amide-containing aluminum powder into the glass fiber-thickened tridecyl alcohol there was produced a smooth buttery suspension having the following composition:

|  | Weight Percent |
|---|---|
| Aluminum powder | 68.72 |
| Fatty acid amide | 1.43 |
| Glass microfibers | 0.75 |
| Tridecyl alcohol | 29.10 |

EXAMPLE 6

A suspension was prepared by the same procedure outlined in Example 3 with the change that triamylamine was substituted for kerosene as a vehicle. On blending the fatty acid containing amide into glass fiber-thickened triamylamine, there was produced a smooth buttery suspension having the following composition:

|  | Weight Percent |
|---|---|
| Aluminum powder | 68.72 |
| Fatty acid amide | 1.43 |
| Glass microfibers | 0.75 |
| Triamylamine | 29.10 |

The foregoing examples demonstrate the formation of gel propellants having high heats of combustion by suspending prescribed low atomic weight elements and compounds thereof in liquid vehicles by the action of microfibers.

EXAMPLE 7

Chrysotile fibers having an average fiber diameter between 0.1 and 1 microns were blended into a paraffin base gas oil fraction having a boiling point range of 506 to 650° F., an SUS viscosity at 100° F. of 41.2 and an unsulfonatable residue of 94. Copper hydroxide powder having an average particle size of less than 1 micron was slowly added to the asbestos-thickened gas oil fraction with stirring until there was formed a soft smooth suspension having the following composition.

|  | Weight Percent |
| --- | --- |
| Copper hydroxide | 5.0 |
| Gas oil | 92.0 |
| Asbestos fibers | 3.0 |

After 36 weeks of storage only a slight amount of oil had separated from this suspension which was still uniform and readily flowable. There was no noticeable separation of dense or putty-like sediment.

EXAMPLE 8

Kodel, a polyethylene glycol-terephthalate ester fiber, having an average fiber diameter between 5 and 10 microns, was blended into the same paraffin base gas oil fraction employed in Example 7. Copper hydroxide having an average particle size of less than 1 micron was slowly added to the fiber thickened gas oil fraction and the mixture stirred in a Waring Blendor for 1 minute after all the copper hydroxide had been added. There was formed a smooth suspension having the following composition:

|  | Weight Percent |
| --- | --- |
| Copper hydroxide | 5.0 |
| Gas oil | 94.0 |
| Polyethylene glycol-terephthalate ester fibers | 1.0 |

The stability of this suspension was evidenced by the absence of any copper hydroxide sediment and less than 5 percent separation of clear oil after 1 week's standing.

EXAMPLE 9

Newsprint pulp consisting essentially of cellulose fibers having an average particle diameter between 5 and 10 microns was blended into the same gas oil fraction employed in Example 7. Copper hydroxide powder having an average particle size of less than 1 micron was slowly added to the thickened gas oil fraction with stirring and the complete mixture stirred for 1 minute in a Waring Blendor after all the copper hydroxide had been added. The resulting product was a soft, smooth suspension having the following composition:

|  | Weight Percent |
| --- | --- |
| Copper hydroxide | 5.0 |
| Gas oil | 94.0 |
| Newsprint pulp fibers | 1.0 |

After 1 week's standing there was no noticeable separation or sedimentation of copper hydroxide.

Examples 7, 8 and 9 are all effective fungicides and find particular usefulness in agriculture against fungi which afflict plants, such as Sigatoka. The stable copper oxide suspensions of Examples 7, 8 and 9 can be applied, per se, to plants or they can be diluted with additional volumes of hydrocarbon carrier prior to their application.

Comparison of Examples 8 and 9 with Examples 1–7 shows clearly the different requirements of organic and inorganic microfibers in forming the stable suspensions of this invention. In Examples 1–7, inorganic microfibers having an average fiber diameter less than 2 microns were used in order to prepare stable suspensions. In contrast, in Examples 8 and 9, organic microfibers having average fiber diameters between 5 and 10 microns are used to prepare stable suspensions.

We claim:

1. A stable suspension consisting essentially of 3-90 weight percent of a vehicle insoluble powder selected from the group consisting of metals, metalloids, metal and metalloid compounds, 1-naphthyl-N-methyl-carbamate, 3-[2-(3,5-dimethyl-2-oxycyclo-hexyl)-2-hydroxyethyl] glutarimide, N-trichloromethyl mercapto-4-cyclohexene-1,2dicarboximide and tetramethyl thiuram disulfide having a particle size less than 20 mesh, 0.2–3.0 weight percent vehicle insoluble microfibers selected from the group consisting of inorganic microfibers having an average particle diameter between 0.01 and 2.0 microns and organic microfibers having an average fiber diameter between 1 and 20 microns and 5–97 weight percent of a liquid vehicle selected from the group consisting of liquid hydrocarbons, hydrocarbon-soluble polar hydrocarbon derivatives containing at least one radical selected from the group consisting of amino, hydroxy, carbonyl, amide, imide, carboxylic and ester radicals and mixtures of hydrocarbons and said hydrocarbon derivatives.

2. A stable suspension as described in claim 1 in which said microfibers are employed in a concentration between 0.4 and 2.5 weight percent.

3. A stable suspension as described in claim 1 in which inorganic microfibers are selected from the group consisting of asbestos, glass and silica fibers.

4. A stable suspension as described in claim 1 in which organic microfibers are selected from the group consisting of cellulose fibers, nitro-cellulose fibers, carboxylated cellulose fibers, aminoethyl cellulose fibers, cellulose phosphate fibers, carboxymethyl cellulose fibers, poly-halogenated olefin polymer fibers, polypropylene fibers, polyvinyl alcohol fibers and polyvinylacetate fibers.

5. A stable suspension as described in claim 1 wherein said finely-divided powder has an average particle size less than 100 mesh.

6. A stable suspension according to claim 1 in which said vehicle is a liquid hydrocarbon fraction boiling above 150° F.

7. A stable suspension consisting essentially of 25–90 weight percent of a vehicle-insoluble powder selected from the group consisting of metals, metalloids, metal and metalloid compounds, 1-naphthyl-N-methyl-carbamate, 3-[2-(3,5-dimethyl-2-oxycyclo-hexyl)-2-hydroxyethyl] glutarimide, N-trichloromethyl mercapto-4-cyclohexene-1,2-dicarboximide and tetramethyl thiuram disulfide having a particle size less than 100 mesh, 0.2 to 3.0 weight percent vehicle-insoluble microdimensional fibers selected from the group consisting of inorganic microfibers having an average particle diameter between 0.01 and 2.0 microns and organic microfibers having an average fiber diameter between 1 and 20 microns and 5–75 weight percent of a liquid hydrocarbon vehicle, said vehicle containing 0.2 to 20 percent of a texture improving agent, which is a hydrocarbon-soluble polar hydrocarbon derivative containing at least 12 carbon atoms and at least one radical selected from the group consisting of amino, hydroxy, carbonyl, amide, imide, carboxylic and ester radicals.

8. A stable suspension according to claim 7 in which said texture improving agent is present in a concentration between 1 to 10 weight percent of said vehicle.

9. A stable suspended propellant consisting essentially of 50–90 weight percent of a vehicle-insoluble powder selected from the group consisting of aluminum, boron, carbon, boron carbide, beryllium and mixtures thereof, said powder having an average particle size less than 20 mesh, 0.2 to 3.0 weight percent vehicle-insoluble microdimensional fibers selected from the group consisting of inorganic microfibers having an average particle diameter between 0.01 and 2.0 microns and organic microfibers having an average fiber diameter between 1 and 20 microns and 10–50 weight percent of a liquid vehicle selected from the group consisting of liquid hydrocarbons, a hydrocarbon-soluble polar hydrocarbon derivative containing at least one radical selected from the group consisting of amino, hydroxy, carbonyl, amide, imide, carboxylic and ester radicals and mixtures of hydrocarbons and said hydrocarbon derivatives.

10. A stable suspended propellant as described in claim 9 in which said microdimensional fibers are inorganic microfibers having an average fiber diameter between 0.01 and 0.5 micron.

11. A stable suspended propellant as described in claim 9 in which said microfibers are organic microfibers having an average fiber diameter between 1 and 20 microns.

12. A stable suspended propellant as described in claim 9 in which said vehicle is a hydrocarbon fraction boiling between 300° and 750° F. and contains 1–10 weight per cent of a fatty acid derivative containing more than 16 carbon atoms as a texture improving agent.

13. A process for preparing stable suspensions of hydrocarbon-insoluble powders which comprises thickening a liquid vehicle selected from the group consisting of liquid hydrocarbons, hydrocarbon-soluble polar hydrocarbon derivatives substituted with at least one radical selected from the group consisting of amino, hydroxyl, carbonyl, amide, imide, carboxyl and ester radicals and mixtures of hydrocarbons and said hydrocarbon derivatives with hydrocarbon-insoluble microdimensional fibers selected from the group consisting of inorganic microfibers having an average particle diameter between 0.01 and 2.0 microns and organic microfibers having an average fiber diameter between 1 and 20 microns and adding with mixing a hydrocarbon-insoluble powder selected from the group consisting of metals, metalloids, metal and metalloid compounds, 1-naphthyl-N-methyl-carbamate, 3-[2-(3,5-dimethyl-2-oxycyclo-hexyl)-2-hydroxyethyl] glutarimide, N-trichloro-methyl mercapto-4-cyclohexene-1,2-dicarboximide and tetramethyl thiuram disulfide having a particle size less than 20 mesh to said fiber-thickened vehicle to form a stable suspension consisting essentially of 3–90 weight per cent powder, 0.2–3.0 weight per cent microdimensional fibers and 5–97 weight per cent liquid vehicle.

14. A process according to claim 13 in which said powder has an average particle size less than 100 mesh and said fibers are inorganic microfibers having an average fiber diameter between 0.01 and 0.5 micron.

15. A process according to claim 13 in which said powder has an average particle size less than 100 mesh and said fibers are organic microfibers having an average fiber diameter between 1 and 20 microns.

16. A suspended propellant comprising 50–90 percent aluminum powder of 200–325 mesh, 0.2–3.0 weight percent glass microfibers having an average fiber diameter between 0.01 and 0.5 micron, 10–50 weight percent kerosene and 1–10 weight percent of a fatty acid amide containing at least 16 carbon atoms.

* * * * *